United States Patent
Stelzl

(10) Patent No.: US 6,316,730 B1
(45) Date of Patent: *Nov. 13, 2001

(54) CURRENT TRANSMISSION ELEMENT

(75) Inventor: Gerhard Stelzl, Heidenheim (DE)

(73) Assignee: EPCOS Aktiengesellschaft, München (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/508,955

(22) PCT Filed: Aug. 6, 1998

(86) PCT No.: PCT/DE98/02263

§ 371 Date: Mar. 17, 2000

§ 102(e) Date: Mar. 17, 2000

(87) PCT Pub. No.: WO99/14773

PCT Pub. Date: Mar. 25, 1999

(30) Foreign Application Priority Data

Sep. 18, 1997 (DE) ............................................ 197 41 144

(51) Int. Cl.$^7$ ........................................................ H01B 7/08

(52) U.S. Cl. .......................................................... 174/117 M

(58) Field of Search .................................. 174/36, 126.2, 174/117 M; 361/816

(56) References Cited

U.S. PATENT DOCUMENTS

| 2,539,332 | 1/1951 | Schneider | 175/41 |
|---|---|---|---|
| 3,593,072 | 7/1971 | Bailey | 317/243 |
| 5,028,742 | * 7/1991 | Redman | 174/88 R |
| 5,305,941 | 4/1994 | Kent et al. | 228/19 |
| 5,386,345 | 1/1995 | Matsuzaki et al. | 361/816 |

FOREIGN PATENT DOCUMENTS

| 3330538 A1 | 3/1985 | (DE) . |
|---|---|---|
| 3909677 A1 | 9/1990 | (DE) . |
| 0707321 A2 | 4/1996 | (EP) . |

* cited by examiner

Primary Examiner—Chau N. Nguyen
(74) Attorney, Agent, or Firm—Schiff Hardin & Waite

(57) ABSTRACT

The present invention relates to a current transmission element which is used for transmitting a current by a pressure contact at the windings of a capacitor. The current transmission element includes a metalic mesh made of tin-placed wires or a woven mat made of tin-plated wires.

2 Claims, 1 Drawing Sheet

CURRENT TRANSMISSION ELEMENT

BACKGROUND OF THE INVENTION

1. Field of the Invention

The invention is directed to a current transmission element. In particular, the invention relates to a current transmission element for capacitor windings having flame-sprayed contact layers also known as schoopage layers.

2. Description of the Related Art

Generally contact current transmissions are known in applications involving capacitor windings having flame-sprayed contact layers (schoopage layers).

U.S. Pat. No. 3,593,072 incorporated herein by reference discloses a capacitor winding with a schoopage layer that is connected to a mesh screen of copper with the assistance of a soldered connection.

SUMMARY OF THE INVENTION

An object of the present invention is to specify a current transmission element that need not be soldered to the contact layers.

This object is inventively achieved with a current transmission element for capacitor windings having flame-sprayed contact layers or schoopage layers including a knit metal mesh having tin-plated wires that is provided as a pressure contact current transmission.

In another embodiment of the invention, a current transmission element includes a woven metal fabric, also known as mats, having additional tin-plating that is provided for pressure contact current transmission.

Advantageouly, the invention replaces the standard soldering of contacts by a pressure contact current transmission with the assistance of a metal mesh or metal fabric with the participation of tin.

Additional advantages and features of the present invention will become apparent upon reading the following detailed description of the presently preferred embodiments and appended claims, and upon reference to the drawings.

DETAILED DESCRIPTION OF THE PRESENTLY PREFERRED EMBODIMENTS

U.S. Pat. No. 5,386,345, incorporated herein by reference, discloses a metal fabric that serves in the standard way for the electromagnetic shielding of an electronic device arranged in a housing. Teachings that such metal fabrics are also suitable for other applied purposes cannot be derived from this document.

Figure 1:
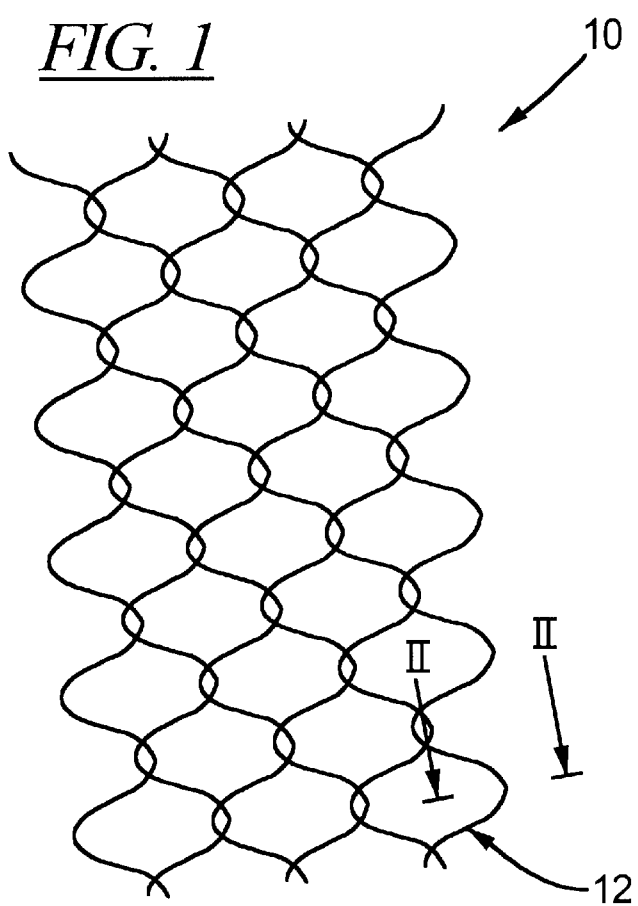
FIG. 1 shows an example of a softly knit metal mesh according to the present invention.

FIG. 1 shows an example of softly knit metal 10 that yields an elastic, large-area contact element having optimum confirmation to uneven contact surfaces.

Figure 2:
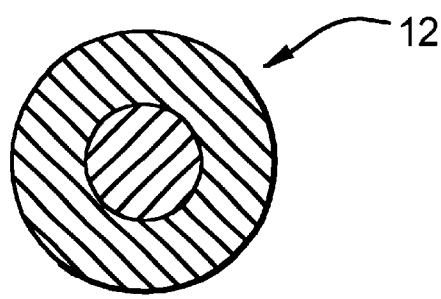
FIG. 2 shows a cross-section of a wire of the metal mesh in FIG. 1.

FIG. 2 shows a cross section of a wire 12 of the metal mesh 10 in FIG. 1. The wire 12 is a plated copper, preferably tin-plated, that may include additional tin-plating for high current transmissions.

Figure 3:
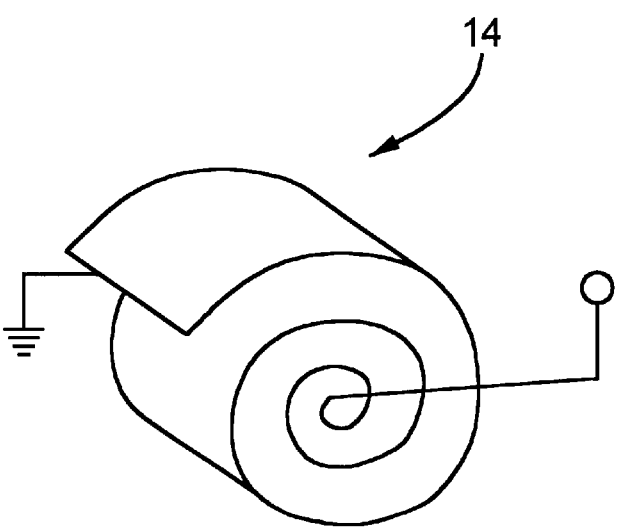
FIG. 3 shows a capacitor winding.

FIG. 3 shows a standard capacitor winding 14 suitable for applications of the current transmission element involving pressure-contact current transmissions of low and high currents. For example, contact current transmission at schoopage capacitor windings.

Figure 4:
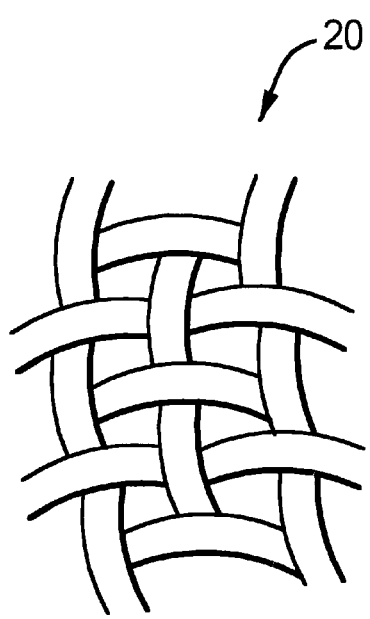
FIG. 4 shows an example of a woven metal fabric according to the present invention.

FIG. 4 shows a woven metal fabric 20 according to an embodiment of the present invention.

Other embodiments according to the present invention have additional tin (e.g. tin bridges) embedded into the fabric and are especially well-suited for high current transmissions.

All required geometries can be fabricated (e.g., punched parts) from the tin-saturated fabric mats (semi-finished goods).

Although other modifications and changes may be suggested by those skilled in the art, it is the intention of the inventors to embody within the patent warranted hereon all changes and modifications as reasonably and properly come within the scope of their contribution to the art.

What is claimed is:

1. A current transmission element for capacitor windings having flame-sprayed contact schoopage layers, the current transmission element comprising:

a softly knit-metal flexible mesh providing an elastic, large-area contact element having substantially optimum confirmation to uneven contact surfaces, said mesh having a plurality of tin-plated wires in flexible pressure contact to the flame-sprayed schoopage contact layer for current transmission; and said mesh being held together with the schoopage contact layer only by pressure contact and not by soldering.

2. A current transmission element for capacitor windings having flame-sprayed contact schoopage layers, the current transmission element comprising:

a softly woven-metal flexible fabric mat providing an elastic, large-area contact element having substantially optimum confirmation to uneven contact surfaces, said mat having tin-plating and being in flexible pressure contact to the flame-sprayed schoopage contact layer for current transmission; and said mat being held together with the schoopage contact layer only by pressure contact and not by soldering.

* * * * *